(12) United States Patent
Takahashi et al.

(10) Patent No.: US 11,699,038 B2
(45) Date of Patent: Jul. 11, 2023

(54) INFORMATION PROCESSING APPARATUS

(71) Applicant: FUJIFILM BUSINESS INNOVATION CORP., Tokyo (JP)

(72) Inventors: Takumi Takahashi, Kanagawa (JP); Motoki Taniguchi, Kanagawa (JP); Tomoki Taniguchi, Kanagawa (JP); Tomoko Ohkuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 235 days.

(21) Appl. No.: 17/177,819

(22) Filed: Feb. 17, 2021

(65) Prior Publication Data

US 2022/0092264 A1 Mar. 24, 2022

(30) Foreign Application Priority Data

Sep. 18, 2020 (JP) ................. 2020-157191

(51) Int. Cl.
G06F 40/284 (2020.01)
G06F 40/205 (2020.01)
G06F 40/289 (2020.01)
G06F 40/279 (2020.01)
G06N 20/00 (2019.01)

(52) U.S. Cl.
CPC .......... *G06F 40/284* (2020.01); *G06F 40/205* (2020.01); *G06F 40/279* (2020.01); *G06F 40/289* (2020.01); *G06N 20/00* (2019.01)

(58) Field of Classification Search
CPC .... G06F 40/279; G06F 40/284; G06F 40/289; G06F 40/205; G06N 20/00
See application file for complete search history.

(56) References Cited

U.S. PATENT DOCUMENTS

| | | | |
|---|---|---|---|
| 2015/0339590 A1* | 11/2015 | Maarek ................. | G06N 20/00 707/754 |
| 2018/0260472 A1* | 9/2018 | Kelsey .................... | G09B 7/02 |
| 2018/0293508 A1* | 10/2018 | Ko ......................... | G06F 16/355 |
| 2019/0012611 A1 | 1/2019 | Matsumura et al. | |
| 2019/0354848 A1* | 11/2019 | Kotri ...................... | G06F 9/451 |
| 2021/0004540 A1* | 1/2021 | Harper ................. | G06F 16/313 |

(Continued)

FOREIGN PATENT DOCUMENTS

| | | |
|---|---|---|
| JP | 2019-16025 A | 1/2019 |
| JP | 2019-191827 A | 10/2019 |

(Continued)

OTHER PUBLICATIONS

Rajpurkar et al.; "SQuAD: 100,000+ Questions for Machine Comprehension of Text;" EMNLP; 2016.

(Continued)

*Primary Examiner* — Samuel G Neway
(74) *Attorney, Agent, or Firm* — Oliff PLC

(57) ABSTRACT

An information processing apparatus includes a processor configured to input an arbitrary text and plural answer candidates extracted from the text to a question generator that generates a question sentence associated with an answer, cause the question generator to generate a question sentence associated with the text and the plural answer candidates, and cause the question generator to output generated data including a set of the plural answer candidates and the question sentence.

14 Claims, 13 Drawing Sheets

(56) References Cited

U.S. PATENT DOCUMENTS

2021/0232948 A1* 7/2021 Otsuka ................ G06N 3/0454
2022/0092264 A1* 3/2022 Takahashi ............. G06N 3/088

FOREIGN PATENT DOCUMENTS

| JP | 2019-215841 A | 12/2019 |
| WO | 2019/208070 A1 | 10/2019 |
| WO | 2019/235103 A1 | 12/2019 |

OTHER PUBLICATIONS

Dasigi et al.; "QUOREF: A Reading Comprehension Dataset with Questions Requiring Coreferential Reasoning;" EMNLP-IJCNLP; 2019.

* cited by examiner

FIG. 1

| Context |
|---|
| (...) In the second quarter, the Rams' struggles continued as Forté got a 47-yard TD run. St. Louis would respond with kicker Josh Brown getting a 43-yard field goal. Chicago would close out the half with Gould making a 43-yard field goal. (...) |
| single-span RC |
| Question: What was Matt Forte's longest touchdown run? <br> Ground Truth: 47-yard TD run |
| multi-span RC |
| Question: Which two players both kicked 43-yard field goal? <br> Ground Truths: Brown, Gould |

FIG. 14

| MODEL | MULTI-ANSWER ||
|---|---|---|
| | EM | F1 |
| UNSUPERVISED MODEL | 19.46 | 48.47 |
| EMBODIMENT | 31.22 | 58.22 |

FIG. 15

| MODEL | MULTI-ANSWER ||
|---|---|---|
| | EM | F1 |
| SUPERVISED MODEL (GOLD) | 59.28 | 81.60 |
| UNSUPERVISED MODEL | 19.46 | 48.47 |
| EMBODIMENT | 31.67 | 60.81 | ns
INFORMATION PROCESSING APPARATUS

CROSS-REFERENCE TO RELATED APPLICATIONS

This application is based on and claims priority under 35 USC 119 from Japanese Patent Application No. 2020-157191 filed Sep. 18, 2020.

BACKGROUND

(i) Technical Field

The present disclosure relates to an information processing apparatus.

(ii) Related Art

There is a proposal for a technology in which an appropriate answer to a given question is extracted from a given related text.

Japanese Unexamined Patent Application Publication No. 2019-16025 discloses an information processing system that automatically generates supervised data for machine learning by using a device. A storage stores a preset check rule showing a condition to determine that an output value from a learning model is true for an input value. A trainer inputs a plurality of input values to the learning model, acquires a plurality of output values from the learning model in response to the plurality of input values, determines whether the plurality of output values are true for the plurality of input values by referring to the check rule, and causes the storage to store a pair of a "true" output value and a corresponding input value as new training data for supervised learning.

Japanese Unexamined Patent Application Publication No. 2019-215841 discloses a question generating apparatus that attains high precisions of answers to questions. The question generating apparatus includes a generator that inputs a question sentence and a related document including an answer to the question sentence, and generates a revised question sentence by making up for a latently missing part in the question sentence with words included in a predetermined lexicon based on a pretrained machine learning model. The generator includes a comparator that generates matching information indicating matching relationships between words in the question sentence and words in the related document, and a question reconstructor that generates the revised question sentence by generating words constituting the revised question sentence from the lexicon based on the matching information generated by the comparator.

Japanese Unexamined Patent Application Publication No. 2019-191827 discloses a question answering apparatus that provides precise answers to questions. The question answering apparatus includes an answer generator that inputs a document and a question, and generates, based on a trained model, an answer sentence to the question by using words included in a sum set of a predetermined first lexicon and a second lexicon including words in the document and the question. The trained model includes a trained neural network that is pretrained as to whether the words to be included in the answer sentence are included in the second lexicon. When generating the answer sentence, the trained model changes, using the trained neural network, a probability of selection of words in the second lexicon as the words to be included in the answer sentence.

SUMMARY

Aspects of non-limiting embodiments of the present disclosure relate to the following circumstances. A plurality of answers may be extracted from analysis target data in response to a question by using a machine reading comprehension model. To extract the plurality of answers from the analysis target data, a multi-answer model needs to be trained by preparing in advance a data set including a set of a question sentence and a plurality of answers. Compared with a single-answer data set, the multi-answer data set is complex and is not therefore prepared easily.

It is appropriate that a data set including a set of a question sentence and a plurality of answers be created by using a single-answer data set including sets of a question sentence and a single answer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to input an arbitrary text and a plurality of answer candidates extracted from the text to a question generator that generates a question sentence associated with an answer, cause the question generator to generate a question sentence associated with the text and the plurality of answer candidates, and cause the question generator to output generated data including a set of the plurality of answer candidates and the question sentence.

BRIEF DESCRIPTION OF THE DRAWINGS

An exemplary embodiment of the present disclosure will be described in detail based on the following figures, wherein:

FIG. 1 illustrates an example of extractive machine reading comprehension;

FIG. 14 illustrates scores of multi-answer QA of multi-answer models; and

FIG. 15 illustrates scores of multi-answer QA of multi-answer models.

DETAILED DESCRIPTION

Figure 2:
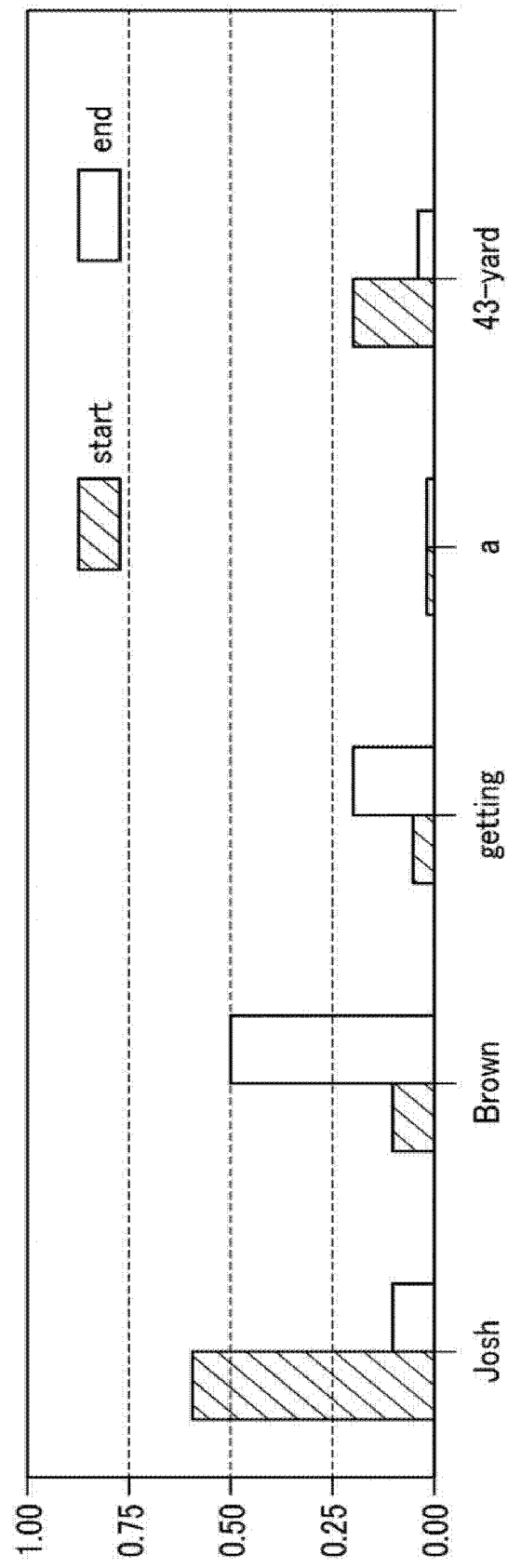
FIG. 2 illustrates an example of a probability distribution to be output from an answer model.

An exemplary embodiment of the present disclosure is described below with reference to the drawings. In the drawings, the same or equivalent components and parts are represented by the same reference symbols. In the drawings, dimensional ratios are exaggerated for convenience of description and may differ from actual ratios.

Prior to detailing the exemplary embodiment of the present disclosure, the basic principle of the exemplary embodiment is described.

A machine reading comprehension task is intended to comprehend a given text and answer a question. The machine reading comprehension task is provided to benchmark the comprehension of a model that extracts an answer. For example, in extractive machine reading comprehension using SQuAD (Pranav Rajpurkar, Jian Zhang, Konstantin Lopyrev, and Percy Liang. SQuAD: 100,000+ questions for machine comprehension of text. In EMNLP, 2016), an optimum answer to a given question is extracted from a given related text (context).

In the field of extractive machine reading comprehension, researches have been conducted into a single-answer model that supports question answering based on an answer range including one answer to a question (hereinafter referred to as "single-answer QA"). However, there is a demand for extractive machine reading comprehension that supports question answering based on an answer range including a plurality of answers to a question (hereinafter referred to as "multi-answer QA") as well as the single-answer QA.

FIG. 1 illustrates an example of the extractive machine reading comprehension, and illustrates examples of questions and a related text (context). In the extractive machine reading comprehension illustrated in FIG. 1, a single or plurality of answers are extracted. In the extraction of a single answer in FIG. 1, a phrase "47-yard TD run" is extracted from the related text as an appropriate answer to a question. In the extraction of a plurality of answers in FIG. 1, words "Brown" and "Gould" are extracted from the related text as appropriate answers to a question.

An answer model in the extractive machine reading comprehension outputs a probability distribution about possible ranges of answers to questions from the related text, and extracts answers based on the probability distribution. FIG. 2 illustrates an example of the probability distribution to be output from the answer model. FIG. 2 illustrates a probability distribution about a beginning word and an end word of an answer. In the example of FIG. 2, the answer model performs calculation to determine that "Josh" has the highest probability as the beginning word of the answer and "Brown" has the highest probability as the end word of the answer. Thus, the answer model outputs "Josh Brown" as the answer.

In a case where a plurality of answers are included in the related text, answers output from the single-answer model do not often match each other. By using a plurality of single-answer models, a plurality of answers may be extracted from the question and the related text. However, there is room for improvement in the precision of the plurality of answers to be extracted from the question by preparing the plurality of single-answer models. Therefore, it is appropriate to extract the plurality of answers from the question and the related text by using a multi-answer model that supports the multi-answer QA.

The multi-answer model is trained to increase the answer precision of the multi-answer model. To train the multi-answer model that supports the multi-answer QA, a complex data set for obtaining a plurality of answers from one question (multi-answer data set) is needed compared with training of the single-answer model that supports the single-answer QA. Time and effort are required to manually prepare the complex data set. Therefore, it is appropriate to automatically generate the multi-answer data set from a data set of the single-answer model that may be prepared with less time and effort than the answer model that supports the multi-answer QA.

As described below, the multi-answer data set may be generated from the single-answer data set. Further, the multi-answer model is trained by using the generated multi-answer data set, and answers are extracted by the trained multi-answer model.

Figure 3:
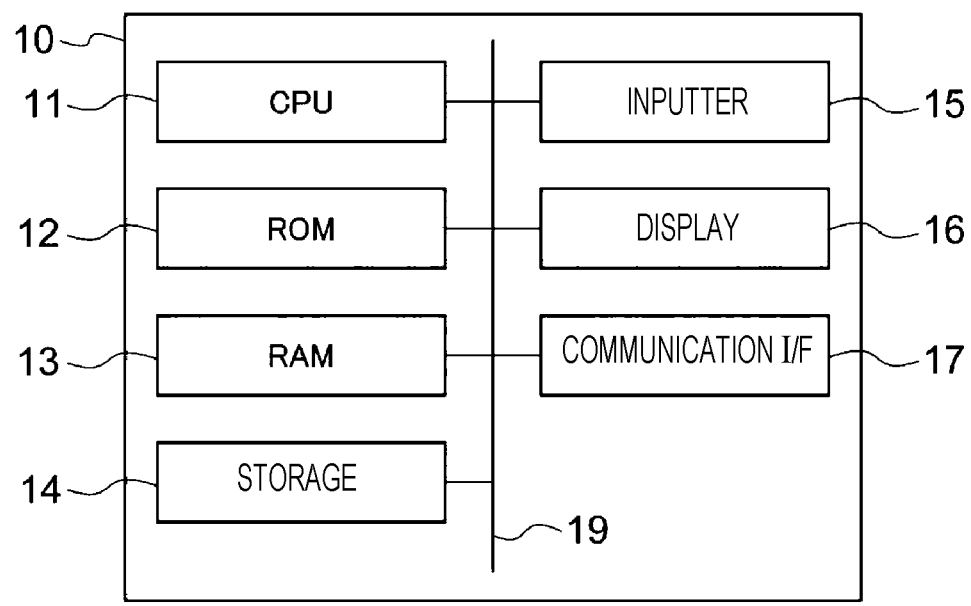
FIG. 3 is a block diagram illustrating the hardware configuration of an information processing apparatus.

FIG. 3 is a block diagram illustrating the hardware configuration of an information processing apparatus 10. The information processing apparatus 10 illustrated in FIG. 3 extracts a single or plurality of answers from a question by using a multi-answer model that supports single-answer QA and multi-answer QA.

As illustrated in FIG. 3, the information processing apparatus 10 includes a central processing unit (CPU) 11, a read only memory (ROM) 12, a random access memory (RAM) 13, a storage 14, an inputter 15, a display 16, and a communication interface (I/F) 17. Those components are communicably connected via a bus 19.

The CPU 11 executes various programs and controls individual parts. The CPU 11 reads the programs from the ROM 12 or the storage 14, and executes the programs by using the RAM 13 as a working area. The CPU 11 controls the individual components and performs various arithmetic processes based on the programs recorded in the ROM 12 or the storage 14. In this exemplary embodiment, the ROM 12 or the storage 14 stores a generation program for generating a multi-answer data set from single-answer data set, a training program for training the multi-answer model by using the multi-answer data set, and an answer extracting program for extracting a plurality of answers from a question by using the multi-answer model.

The ROM 12 stores various programs and various types of data. The RAM 13 temporarily stores a program or data as the working area. The storage 14 includes a hard disk drive (HDD), a solid state drive (SSD), a flash memory, or other storage devices, and stores various types of data and various programs including an operating system.

The inputter 15 includes a keyboard and a pointing device such as a mouse, and is used for inputting various types of information.

Examples of the display 16 include a liquid crystal display that displays various types of information. The display 16 may function as the inputter 15 by employing a touch panel system.

The communication interface 17 is used for communicating with other devices such as a user terminal. Examples of the communication interface 17 include Ethernet (registered trademark), FDDI, and Wi-Fi (registered trademark).

To execute the generation program, the training program, and the answer extracting program, the information processing apparatus 10 implements various functions by using the hardware resources described above. The functional configuration of the information processing apparatus 10 is described.

Figure 4:
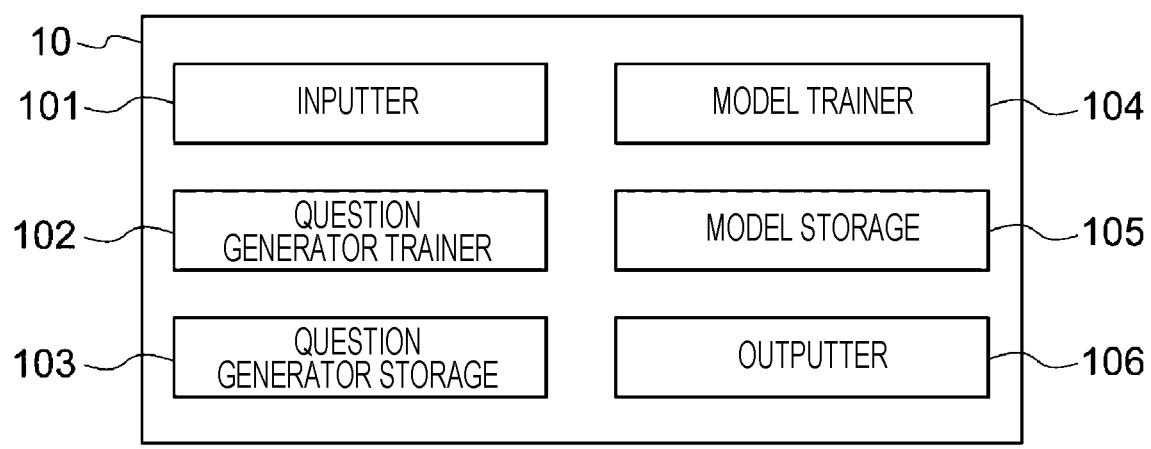
FIG. 4 is a block diagram illustrating an example of the functional configuration of the information processing apparatus.

FIG. 4 is a block diagram illustrating an example of the functional configuration of the information processing apparatus 10.

As illustrated in FIG. 4, the information processing apparatus 10 includes an inputter 101, a question generator trainer 102, a question generator storage 103, a model trainer 104, a model storage 105, and an outputter 106 as functional components. The functional components are implemented by the CPU 11 that reads and executes the generation program, the training program, and the answer extracting program stored in the ROM 12 or the storage 14.

The inputter 101 inputs information for causing the model trainer 104 to train the multi-answer model, and information for causing the multi-answer model to extract answers. Specific examples of the information are described later in detail. The inputter 101 also inputs a text and a question sentence from which the trained multi-answer model extracts a plurality of answers.

The question generator trainer 102 trains a question generator that outputs generated data including a set of a text (context), a question, and an answer for training the multi-answer model. The question generator is stored in the question generator storage 103 and trained by using a single-answer data set created by a human. The type of the single-answer data set is not limited. For example, the question generator is built by using a neural network. The single-answer data set includes a plurality of sets of a text, a question about the text, and an answer to the question. In response to an input of a text and an answer candidate in the text, the question generator generates a question whose answer is the answer candidate, and outputs data including a set of the text and the generated question. The generated data output from the question generator is a basis for training data for the multi-answer model. That is, the generated data output from the question generator is a basis for a multi-answer data set to be generated from the single-answer data set.

The model trainer 104 trains the multi-answer model by using the generated data output from the question generator and including the sets of a text, a question, and an answer. The multi-answer model is stored in the model storage 105. The model trainer 104 trains the multi-answer model by using the single-answer data set used in the training of the question generator in addition to the generated data output from the question generator.

The outputter 106 outputs results of machine reading comprehension using the multi-answer model from the text and the question sentence input by the inputter 101.

Next, operations of the information processing apparatus 10 are described.

(First Generation Process and First Training Process)

Figure 5:
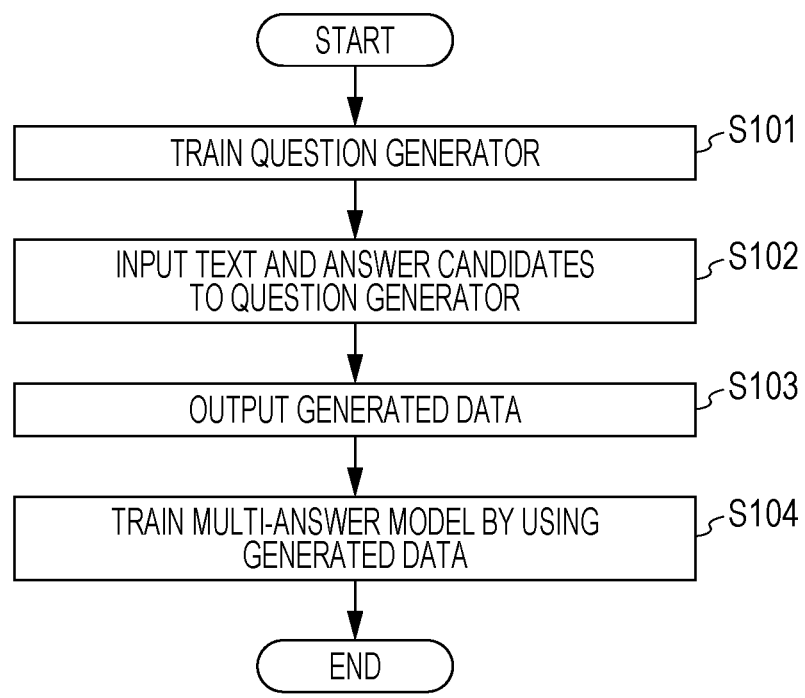
FIG. 5 is a flowchart illustrating a flow of a training process to be performed by the information processing apparatus.
Figure 6:
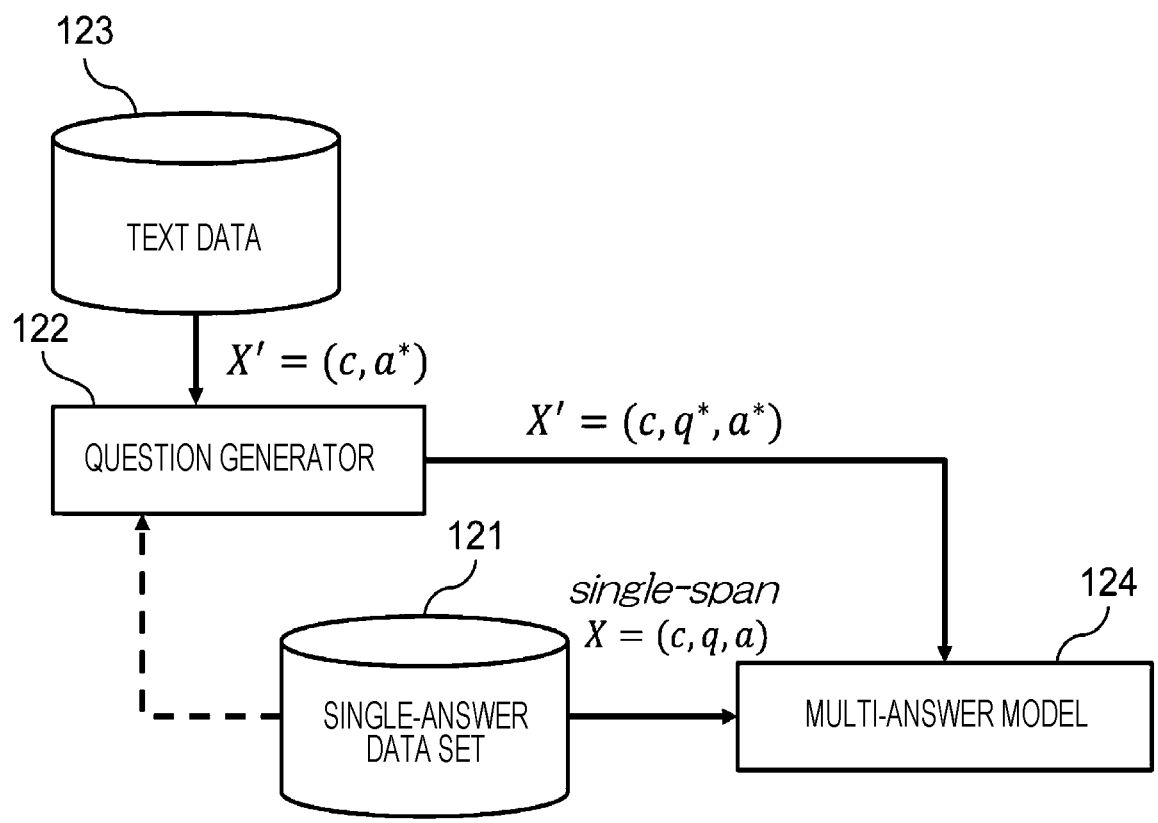
FIG. 6 illustrates an overview of the training process to be performed by the information processing apparatus.

FIG. 5 is a flowchart illustrating a flow of a generation process and a training process to be performed by the information processing apparatus 10. FIG. 6 illustrates an overview of the training process to be performed by the information processing apparatus 10. The training process is performed by the CPU 11 that reads the generation program and the training program from the ROM 12 or the storage 14 and loads the programs on the RAM 13 to execute the programs.

The CPU 11 trains the question generator that generates a question sentence associated with an answer by using a single-answer data set prepared in advance (Step S101). An arbitrary single-answer data set may be used for training the question generator.

The process of Step S101 is described with reference to FIG. 6. The CPU 11 trains a question generator 122 by inputting a single-answer data set 121 prepared in advance to the question generator 122. As described above, the single-answer data set 121 includes a plurality of sets of a text, a question about the text, and an answer to the question. The method for training the question generator 122 is not limited to a specific method. For example, the CPU 11 may train the question generator 122 by renewing parameters of the question generator 122 to reduce a deviation between the correct question and the question generated by the question generator 122.

After Step S101, the CPU 11 inputs a text and answer candidates in the text to the trained question generator 122 (Step S102). In Step S102, data including a plurality of answer candidates in one text is input to the question generator 122.

The process of Step S102 is described with reference to FIG. 6. The CPU 11 extracts one set X' from text data 123 including a plurality of sets of a text and answer candidates in the text, and inputs the set X' to the question generator 122. The set X' input to the question generator 122 from the text data 123 includes a text c and answer candidates a* in the text c. At least two answer candidates a* are included in one text c. The answer candidates a* may be generated by analyzing the text c in advance, or by a human who reads the text c and chooses words in the text c as the answer candidates. The text data 123 includes texts extracted from various document sources in advance. Examples of the document source include a website on the Internet. The text data 123 may be stored in the information processing apparatus 10 or in a different apparatus.

After Step S102, the CPU 11 causes the question generator 122 to generate a question based on the text and the answer candidates input to the question generator 122, and outputs generated data including a set of the text, the question, and the answer candidates (Step S103).

The process of Step S103 is described with reference to FIG. 6. When the set X' including the text c and the answer candidates a* in the text is input to the question generator 122 from the text data 123, the question generator 122 generates a question q* whose answers are the answer candidates a* based on the text c and the answer candidates a*. Since at least two answer candidates a* are included in one text c, the answers to the question q* generated by the question generator 122 are the plurality of answer candidates a*. Then, the question generator 122 outputs generated data X' including a set of the text c, the generated question q*, and the answer candidates a*. The generated data X' output from the question generator 122 serves as a multi-answer data set.

After Step S103, the CPU 11 trains a multi-answer model by using the generated data generated by the question generator 122 (Step S104).

The process of Step S104 is described with reference to FIG. 6. The generated data X' generated by the question generator 122 is input to a multi-answer model 124. The CPU 11 trains the multi-answer model 124 by using the generated data X'. When training the multi-answer model 124, the CPU 11 also inputs the single-answer data set 121 to the multi-answer model 124. The method for training the multi-answer model 124 is not limited to a specific method. For example, the CPU 11 may train the multi-answer model 124 by renewing parameters of the multi-answer model 124 to reduce deviations between the answer candidates a* extracted in the process of Step S102 and answers predicted by the multi-answer model 124.

(Second Generation Process and Second Training Process)

Figure 7:
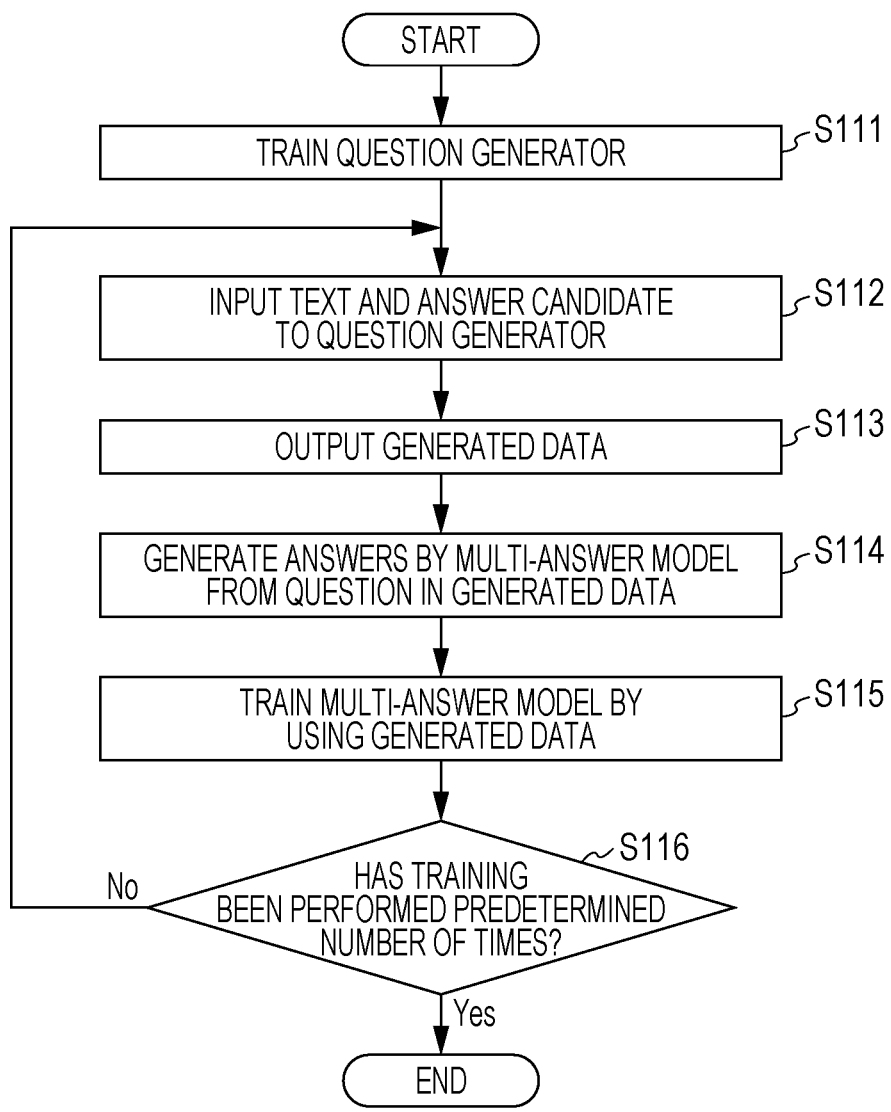
FIG. 7 is a flowchart illustrating a flow of a training process to be performed by the information processing apparatus.
Figure 8:
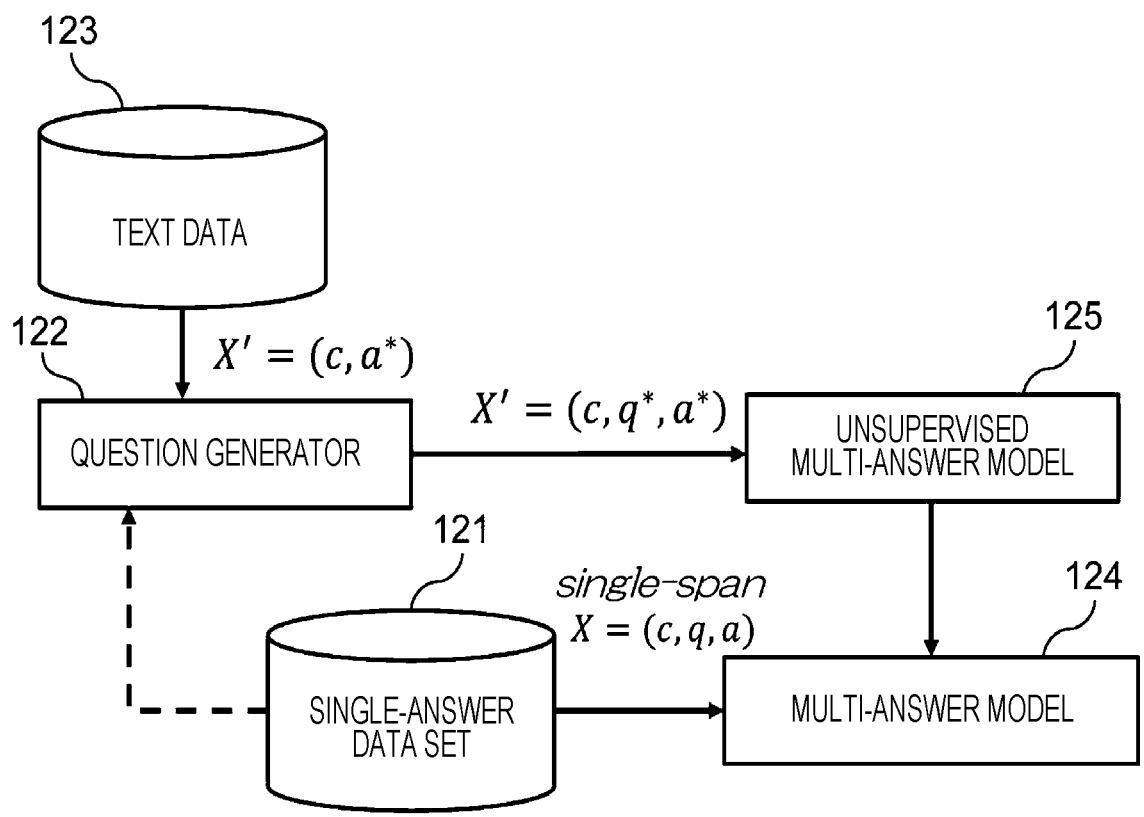
FIG. 8 illustrates an overview of the training process to be performed by the information processing apparatus.

Description is made about another example of the generation process and the training process to be performed by the information processing apparatus 10. FIG. 7 is a flowchart illustrating a flow of the training process to be performed by the information processing apparatus 10. FIG. 8 illustrates an overview of the training process to be performed by the information processing apparatus 10. The training process is performed by the CPU 11 that reads the generation program and the training program from the ROM 12 or the storage 14 and loads the programs on the RAM 13 to execute the programs.

The CPU 11 trains the question generator by using the single-answer data set prepared in advance (Step S111).

After Step S111, the CPU 11 inputs a text and an answer candidate in the text to the trained question generator 122 (Step S112). In Step S112, data including one answer candidate in one text is input to the question generator 122.

After Step S112, the CPU 11 causes the question generator 122 to generate a question based on the text and the answer candidate input to the question generator 122, and outputs generated data including a set of the text, the question, and the answer candidate (Step S113).

The process of Step S113 is described with reference to FIG. 8. When a set X' including a text c and an answer candidate a* in the text is input to the question generator 122 from the text data 123, the question generator 122 generates a question q* whose answer is the answer candidate a* based on the text c and the answer candidate a*. Since one answer candidate a* is included in one text c, the answer to the question q* generated by the question generator 122 is the one answer candidate a*. Then, the question generator 122 outputs generated data X' including a set of the text c, the generated question q*, and the answer candidate a*.

After Step S113, the CPU 11 inputs the generated data generated by the question generator 122 to an unsupervised multi-answer model 125 (Step S114).

The process of Step S114 is described with reference to FIG. 8. The generated data X' generated by the question generator 122 is input to the unsupervised multi-answer model 125. For example, the unsupervised multi-answer model may include one or more pretrained single-answer models.

In a case where the unsupervised multi-answer model 125 includes a plurality of pretrained single-answer models, the single-answer models of the unsupervised multi-answer model 125 extract answers from the question in response to the input of the generated data X'. If the extracted answers differ from each other, the unsupervised multi-answer model 125 outputs a plurality of answers from the generated data X'. If all the extracted answers are the same, the unsupervised multi-answer model 125 outputs a single answer from the generated data X'. If none of the single-answer models extracts an answer from the question, the unsupervised multi-answer model 125 outputs a result showing that no answer is extracted from the generated data X'.

In a case where the unsupervised multi-answer model 125 includes one pretrained single-answer model, the single-answer model of the unsupervised multi-answer model 125 attempts to extract top N answers from the question in response to the input of the generated data X'. If the extracted top N answers differ from each other, the unsupervised multi-answer model 125 outputs a plurality of answers from the generated data X'. If the extracted top N answers are the same, the unsupervised multi-answer model 125 outputs a single answer from the generated data X'. If the single-answer model fails to extract an answer from the question, the unsupervised multi-answer model 125 outputs a result showing that no answer is extracted from the generated data X'.

If a plurality of answers are extracted from the generated data X', the unsupervised multi-answer model 125 substitutes the extracted answers for the answer candidate in the generated data X'. Referring to FIG. 8, if a plurality of answers are extracted from the generated data X', the unsupervised multi-answer model 125 substitutes extracted answers a^ for the input answer candidate a*.

After Step S114, the CPU 11 trains the multi-answer model by using the generated data output from the unsupervised multi-answer model 125 (Step S115).

The process of Step S115 is described with reference to FIG. 8. The generated data X' output from the unsupervised multi-answer model 125 is input to the multi-answer model 124. The CPU 11 trains the multi-answer model 124 by using the generated data X' output from the unsupervised multi-answer model 125. When training the multi-answer model 124, the CPU 11 also inputs the single-answer data set 121 to the multi-answer model 124. The method for training the multi-answer model 124 is not limited to a specific method. For example, the CPU 11 may train the multi-answer model 124 by renewing parameters of the multi-answer model 124 to reduce deviations between the answers substituted by the unsupervised multi-answer model 125 and answers predicted by the multi-answer model 124.

If only one answer is included in the generated data output from the unsupervised multi-answer model 125 or if the unsupervised multi-answer model 125 fails to extract an answer, the generated data X' output from the unsupervised multi-answer model 125 is not used for training the multi-answer model 124.

The multi-answer model 124 trained by using the generated data X' may be replaced with the unsupervised multi-answer model 125 to which the generated data generated by the question generator 122 is input.

After Step S115, the CPU 11 determines whether the multi-answer model 124 has been trained a predetermined number of times (Step S116).

If a result of the determination in Step S116 shows that the multi-answer model 124 has not yet been trained the predetermined number of times (Step S116: No), the CPU 11 returns to Step S112 and inputs a text and an answer candidate in the text to the trained question generator 122. If the result of the determination in Step S116 shows that the multi-answer model 124 has been trained the predetermined number of times (Step S116: Yes), the CPU 11 terminates the series of processes.

(Check of Generated Data)

The CPU 11 may check whether the question and the answer in the generated data output from the question generator 122 are appropriate. The CPU 11 may use the generated data output from the question generator 122 for training the multi-answer model 124 only when determining that the question and the answer are appropriate. The check of the generated data is applicable to both the first generation process and the second generation process.

Figure 9:
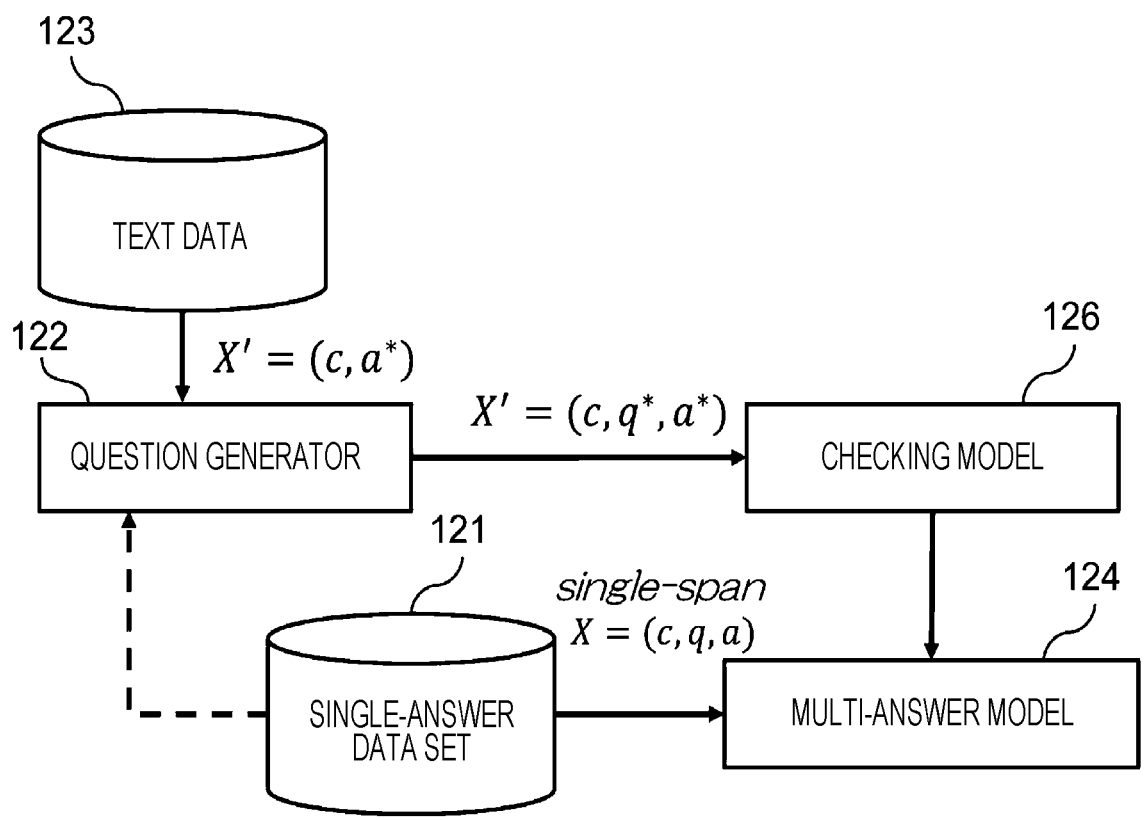
FIG. 9 illustrates an overview of a training process to be performed by the information processing apparatus.

FIG. 9 illustrates an overview of a training process to be performed by the information processing apparatus 10. A checking model 126 checks whether the question and the answer in the generated data X' output from the question generator 122 are appropriate. The generated data X' is used for training the multi-answer model 124 only when the checking model 126 determines that the question and the answer are appropriate.

Figure 10:
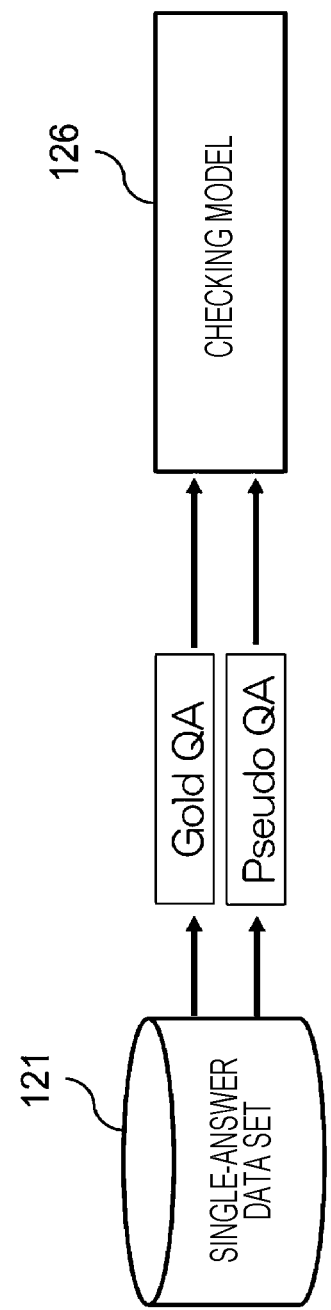
FIG. 10 illustrates an overview of a training process for a checking model.

A specific example of a training process for the checking model 126 is described. The checking model 126 is trained by using an appropriate question and an appropriate answer output from the single-answer data set 121 (Gold QA) and an inappropriate question and an inappropriate answer generated from the single-answer data set 121 (Pseudo QA). FIG. 10 illustrates an overview of the training process for the checking model 126. A label "True" (appropriate) is assigned to Gold QA and a label "False" (inappropriate) is assigned to Pseudo QA.

Figure 11:
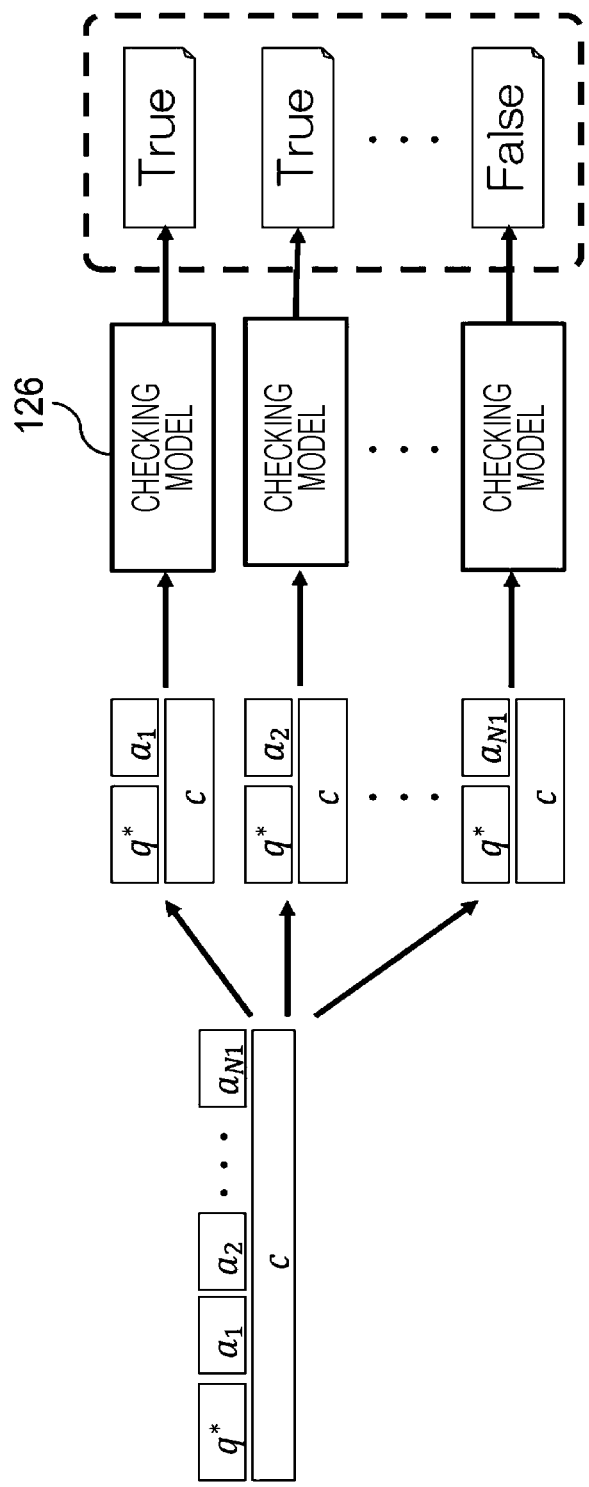
FIG. 11 illustrates an overview of a checking process to be performed by the checking model.

Next, a specific example of a checking process to be performed by the checking model 126 is described. The checking model 126 checks one by one the answer candidates in the generated data X' output from the question generator 122. FIG. 11 illustrates an overview of the checking process to be performed by the checking model 126. In FIG. 11, the checking model 126 checks each of N1 answer candidates in the generated data X' output from the question generator 122.

If the checking model 126 determines that all the answer candidates are appropriate as a result of checking the N1 answer candidates, the generated data X' output from the question generator 122 may be used for training the multi-answer model 124. If the checking model 126 determines that any answer candidate is inappropriate, the generated data X' output from the question generator 122 need not be used for training the multi-answer model 124.

If the checking model 126 determines that the number of appropriate answer candidates is equal to or larger than a predetermined threshold M1 (M1<N1) as a result of checking the N1 answer candidates, the generated data X' output from the question generator 122 may be used for training the multi-answer model 124. If the checking model 126 determines that the number of appropriate answer candidates is smaller than the predetermined threshold M1, the generated data X' output from the question generator 122 need not be used for training the multi-answer model 124.

Reconstructed generated data X^ including only appropriate answer candidates a^ determined by the checking model 126 as a result of checking the N1 answer candidates may be used as supervised data for the multi-answer model 124. If the number of appropriate answer candidates is equal to or smaller than 1, the generated data X' output from the question generator 122 is not used for training the multi-answer model 124.

(Answer Reconstruction)

The CPU 11 may attempt to reconstruct the answers in the generated data output from the question generator 122. The CPU 11 may reconstruct the answers by inputting data to a plurality of single-answer models. The answer reconstruction is applicable to both the first generation process and the second generation process.

Figure 12:
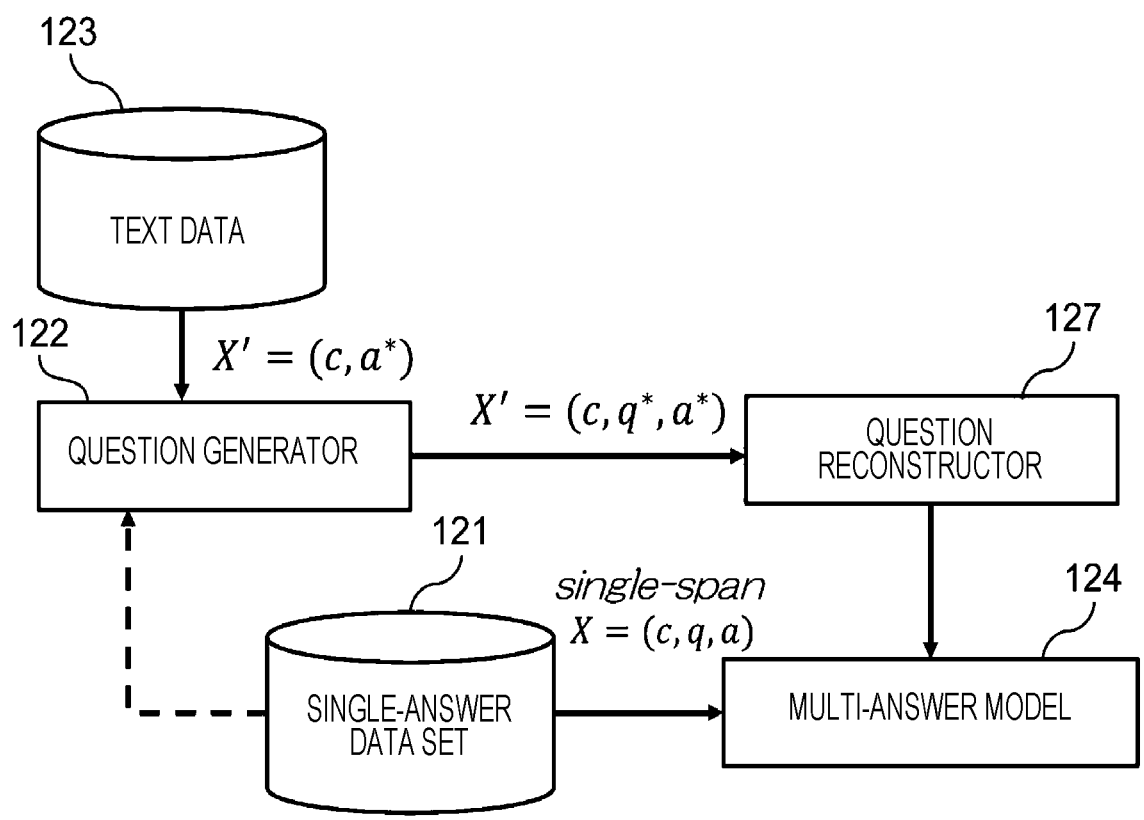
FIG. 12 illustrates an overview of a training process to be performed by the information processing apparatus.

FIG. 12 illustrates an overview of a training process to be performed by the information processing apparatus 10. A question reconstructor 127 includes a plurality of single-answer models, and the generated data X' output from the question generator 122 is input to the question reconstructor 127. The question reconstructor 127 reconstructs the question in the generated data X', and outputs only generated data X' including a successfully reconstructed question as supervised data for the multi-answer model 124.

Figure 13:
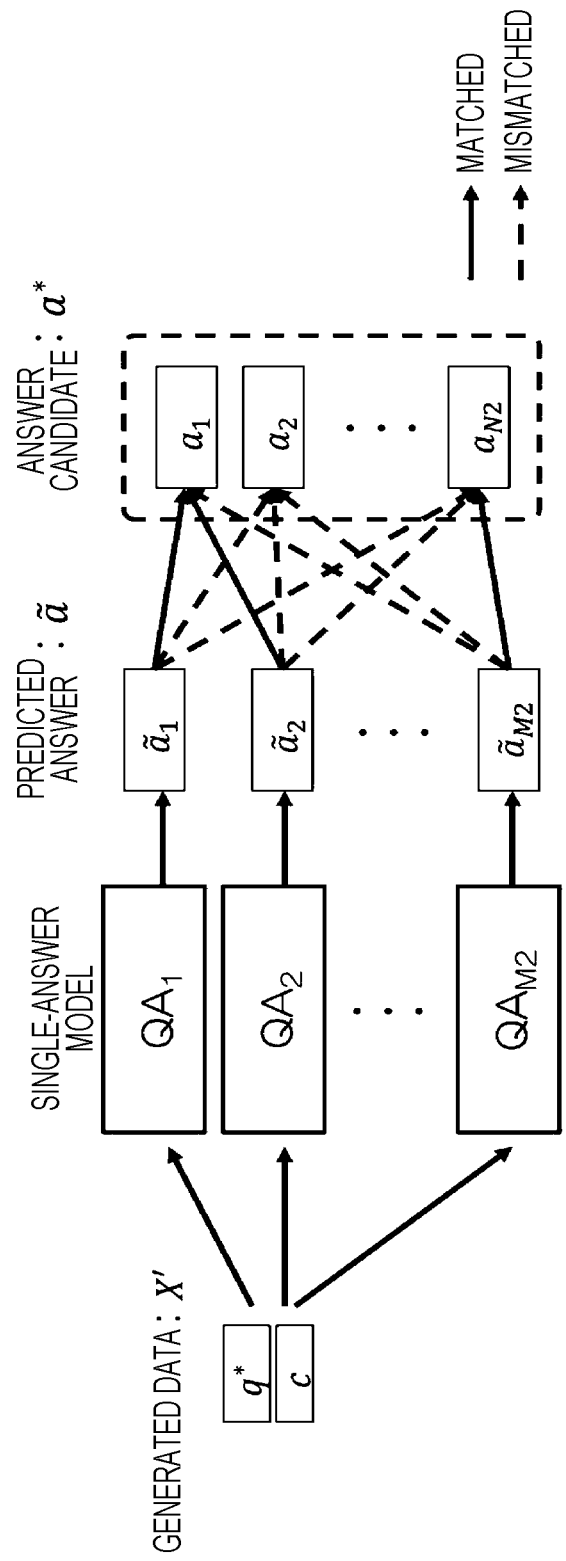
FIG. 13 illustrates an overview of reconstruction of a question to be performed by a question reconstructor.

FIG. 13 illustrates an overview of the reconstruction of the question to be performed by the question reconstructor 127. The generated data X' output from the question generator 122 is input to M2 single-answer models. The number M2 is equal to or larger than a number N2 of answer candidates in the generated data X'. The M2 single-answer models generate and output predicted answers $\tilde{a}_1$ to $\tilde{a}_{M2}$.

The question reconstructor 127 adds the generated data X' output from the question generator 122 as supervised data for the multi-answer model 124 only when all the predicted answers match the answer candidates. The question reconstructor 127 makes evaluation as to whether the predicted answer matches the answer candidate based on an exact match (EM) or a partial match (F1) of words or character strings of the answers.

In the example of FIG. 13, an answer candidate $a_2$ does not match any predicted answer. Therefore, the question reconstructor 127 determines that the answer candidates in this generated data X' are not successfully reconstructed. Thus, the question reconstructor 127 does not add the generated data X' as supervised data for the multi-answer model 124, and discards the generated data X' as an inappropriate example.

FIG. 14 illustrates scores of multi-answer QA of the multi-answer model trained through the training process using the generated data generated through the generation process according to this exemplary embodiment. In FIG. 14, the multi-answer model trained through the second training process is used. As a comparative example, FIG. 14 illustrates a multi-answer model that extracts a plurality of answers by using a plurality of single-answer models (unsupervised models). As the single-answer data set, QUOREF (Pradeep Dasigi, Nelson F. Liu, Ana Marasovic, Noah A. Smith, Matt Gardner. Quoref: A Reading Comprehension Dataset with Questions Requiring Coreferential Reasoning. In EMNLP-IJCNLP, 2019) is used. As illustrated in FIG. 14, the scores of the multi-answer QA of the multi-answer model trained through the training process according to this exemplary embodiment are higher, in terms of the exact match (EM) and the partial match (F1), than scores of the multi-answer model that extracts a plurality of answers by using the plurality of single-answer models.

FIG. 15 illustrates scores of the multi-answer QA of the multi-answer model trained through the training process using the generated data generated through the generation process according to this exemplary embodiment. In FIG. 15, the multi-answer model trained through the second training process is used. As comparative examples, FIG. 15 illustrates a multi-answer model trained by using a data set generated by a human (Gold), and a multi-answer model that extracts a plurality of answers by using a plurality of single-answer models (unsupervised models). As the single-answer data set, QUOREF is used similarly to the example of FIG. 14.

As illustrated in FIG. 15, the multi-answer model trained by using the data set generated by a human (Gold) has the highest scores. The scores of the multi-answer QA of the multi-answer model trained through the training process according to this exemplary embodiment are higher, in terms of the exact match (EM) and the partial match (F1), than scores of the multi-answer model that extracts a plurality of answers by using the plurality of single-answer models.

The generation process, the training process, and the answer extracting process executed by the CPU that reads software (programs) in the exemplary embodiment may be executed by various processors other than the CPU. Examples of the processors include a field-programmable gate array (FPGA) and other programmable logic devices (PLDs) having circuit structures reconfigurable after the manufacture, and an application specific integrated circuit (ASIC) and other dedicated electric circuits serving as processors having dedicated circuit structures designed to execute specific processes. The generation process, the training process, and the answer extracting process may be executed by one of the various processors or by a combination of two or more processors of the same type or different types (e.g., a plurality of FPGAs or a combination of a CPU and an FPGA). The hardware configurations of the various processors are, more specifically, electric circuits obtained by combining circuit elements such as semiconductor elements.

In the exemplary embodiment, the programs of the generation process, the training process, and the answer extracting process are prestored (preinstalled) in the ROM or the storage. The method for providing the programs is not limited thereto. The programs may be provided by being recorded in a non-transitory recording medium such as a compact disk read only memory (CD-ROM), a digital versatile disk read only memory (DVD-ROM), or a universal serial bus (USB) memory. The programs may be downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
    input an arbitrary text and a plurality of answer candidates extracted from the text to a question generator,
    cause the question generator to generate a question sentence associated with the text and the plurality of answer candidates, and
    cause the question generator to output generated data including a set of the plurality of answer candidates and the question sentence, wherein
the processor is further configured to
    train a checking model, that checks the generated data, by using appropriate question/answer data extracted from a single-answer data set, and inappropriate question/answer data created from the single-answer data set,
    determine whether the generated data is appropriate by using the checking model, and
    output the generated data only if the generated data is appropriate.

2. The information processing apparatus according to claim 1, wherein the processor is configured to use the generated data as supervised data for a multi-answer reading comprehension model that extracts a plurality of answers from a question and analysis target data, and outputs the plurality of extracted answers.

3. The information processing apparatus according to claim 2, wherein the processor is configured to train the multi-answer reading comprehension model by using the generated data as the supervised data.

4. The information processing apparatus according to claim 3, wherein the processor is configured to train the multi-answer reading comprehension model by further using the single-answer data set as the supervised data.

5. The information processing apparatus according to claim 1, wherein the processor is configured to determine whether each of the plurality of answer candidates in the generated data is appropriate by using the checking model.

6. The information processing apparatus according to claim 1, wherein the processor is configured to train the question generator by using the single-answer data set.

7. An information processing apparatus comprising:
    a processor configured to
        input an arbitrary text and at least one answer candidate extracted from the text to a question generator,
        cause the question generator to generate a question sentence associated with the text and the answer candidate,
        cause the question generator to output generated data including a set of the text and the question sentence,
        input the generated data to a machine reading comprehension model that extracts a plurality of answers to the question sentence from the text, and outputs the extracted answers,
        cause the machine reading comprehension model to generate the plurality of answers to the question sentence in the input generated data, and
        cause the machine reading comprehension model to output the generated data with the plurality of answers added to the generated data, wherein
    the processor is further configured to
        if the plurality of answers output from the machine reading comprehension model include different answers, use the generated data output from the machine reading comprehension model as supervised data for a multi-answer reading comprehension model that extracts a plurality of answers from a question and analysis target data, and outputs the plurality of extracted answers,
        train a checking model, that checks the generated data, by using appropriate question/answer data extracted from a single-answer data set, and inappropriate question/answer data created from the single-answer data set,
        determine whether the generated data is appropriate by using the checking model, and
        use the generated data as the supervised data for the multi-answer reading comprehension model only if the generated data is appropriate.

8. The information processing apparatus according to claim 7, wherein the processor is configured to train the multi-answer reading comprehension model by using the generated data output from the machine reading comprehension model as the supervised data.

9. The information processing apparatus according to claim 8, wherein the processor is configured to train the multi-answer reading comprehension model by further using the single-answer data set as the supervised data.

10. The information processing apparatus according to claim 9, wherein the processor is configured to
- replace the trained multi-answer reading comprehension model with the machine reading comprehension model, and
- input data output from the question generator to the machine reading comprehension model.

11. The information processing apparatus according to claim 7, wherein the processor is configured to determine whether each of a plurality of the answer candidates in the generated data is appropriate by using the checking model.

12. The information processing apparatus according to claim 7, wherein the machine reading comprehension model is configured to extract the answers from the question sentence in the input generated data by using a plurality of the single-answer models prepared in advance.

13. The information processing apparatus according to claim 7, wherein the processor is configured to train the question generator by using the single-answer data set.

14. An information processing apparatus comprising a processor configured to
- input an arbitrary text and at least one answer candidate extracted from the text to a question generator,
- cause the question generator to generate a question sentence associated with the text and the answer candidate,
- cause the question generator to output generated data including a set of the text and the question sentence,
- input the generated data to a machine reading comprehension model that extracts a plurality of answers to the question sentence from the text, and outputs the extracted answers,
- cause the machine reading comprehension model to generate the plurality of answers to the question sentence in the input generated data, and
- cause the machine reading comprehension model to output the generated data with the plurality of answers added to the generated data, wherein the processor is further configured to
- if the plurality of answers output from the machine reading comprehension model include different answers, use the generated data output from the machine reading comprehension model as supervised data for a multi-answer reading comprehension model that extracts a plurality of answers from a question and analysis target data, and outputs the plurality of extracted answers,
- train the multi-answer reading comprehension model by using the generated data output from the machine reading comprehension model and a single-answer data set prepared in advance as the supervised data,
- replace the trained multi-answer reading comprehension model with the machine reading comprehension model, and
- input data output from the question generator to the machine reading comprehension model.

* * * * *